(12) United States Patent
Cai

(10) Patent No.: US 10,985,653 B1
(45) Date of Patent: Apr. 20, 2021

(54) CHARGE PUMP CONVERTER AND CONTROL METHOD

(71) Applicant: Infineon Technologies AG, Neubiberg (DE)

(72) Inventor: Yifeng Cai, Unterhaching (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 16/824,969

(22) Filed: Mar. 20, 2020

(51) Int. Cl.
*H02M 3/07* (2006.01)

(52) U.S. Cl.
CPC ............. *H02M 3/07* (2013.01); *H02M 3/073* (2013.01)

(58) Field of Classification Search
CPC .. H02M 3/07; H02M 3/073; H02M 2003/075; H02M 2003/076
See application file for complete search history.

(56) References Cited

U.S. PATENT DOCUMENTS

| | | | | |
|---|---|---|---|---|
| 5,619,124 A * | 4/1997 | Lim | ...................... | H02M 3/073 323/313 |
| 6,304,467 B1 * | 10/2001 | Nebrigic | ............. | H02J 2207/20 363/49 |
| 6,344,959 B1 * | 2/2002 | Milazzo | ................ | H02M 3/073 361/115 |
| 6,859,091 B1 * | 2/2005 | Nicholson | ............... | H02M 3/07 327/536 |
| 6,972,973 B2 * | 12/2005 | Abe | ...................... | H02M 3/073 327/536 |
| 7,099,167 B2 * | 8/2006 | Fujise | ..................... | H02M 3/07 363/62 |
| 7,106,107 B2 * | 9/2006 | Bhattacharya | ..... | H03K 3/02337 327/206 |
| 7,256,641 B2 * | 8/2007 | Namekawa | ........... | H02M 3/073 327/536 |
| 7,973,592 B2 * | 7/2011 | Pan | ........................ | H02M 3/073 327/536 |
| 8,004,213 B2 * | 8/2011 | Imanaka | ................. | H02M 3/07 315/209 R |
| 9,236,795 B2 * | 1/2016 | Pelley | ..................... | H02M 3/07 |
| 9,548,656 B1 * | 1/2017 | Wang | ...................... | H02M 3/07 |
| 9,819,260 B2 * | 11/2017 | Hissink | ................... | H03F 1/523 |
| 9,847,712 B2 * | 12/2017 | Low | ....................... | H02M 3/073 |
| 9,998,000 B2 * | 6/2018 | Zhang | ..................... | H02M 1/08 |
| 10,340,794 B1 * | 7/2019 | Zhang | ................... | H02M 3/073 |
| 10,404,176 B2 * | 9/2019 | Hu | ......................... | H02M 3/1588 |
| 2007/0090812 A1 | 4/2007 | Dowlatabadi | | |

* cited by examiner

*Primary Examiner* — Thomas J. Hiltunen
(74) *Attorney, Agent, or Firm* — Slater Matsil, LLP

(57) ABSTRACT

An apparatus includes a first switching device and a second switching device connected in series between a first node and a second node, a first voltage blocking device and a second voltage blocking device connected in series between the first node and a third node, a flying capacitor connected between a common node of the first switching device and the second switching device, and a common node of the first voltage blocking device and the second voltage blocking device, and a controller configured to adjust power losses in the first switching device and the second switching device through controlling charge and discharge processes of the flying capacitor.

20 Claims, 14 Drawing Sheets

CHARGE PUMP CONVERTER AND CONTROL METHOD

TECHNICAL FIELD

The present invention relates generally to a charge pump converter and control method.

BACKGROUND

Switching-mode power converters are pervasive in many electronic applications from computers to automobiles. Generally, voltages within a switching-mode power converter are generated by operating a switch coupled to an inductor or a transformer. There may be a variety of conversion topologies. In accordance with the topology difference, switching-mode power converters can be divided into two categories, namely, isolated power converters and non-isolated power converters.

With respect to implementing a switching-mode circuit, a gate driver is used to efficiently drive a power transistor or a plurality of power transistors. The gate drive may be configured to accept a low power signal from a controller and produce switching signals at appropriate speeds and voltage levels. These voltage levels may be established, for example, by using external power sources, voltage regulators, level shifters, charge pump converters and any combinations thereof to ensure that the power transistor is turned on and off. The power transistor may be an Insulated Gate Bipolar Transistor ("IGBT") or a power Metal-Oxide-Semiconductor Field-Effect Transistor ("MOSFET"). The gate driver may have a single output for driving a single gate node of the power transistor. Alternatively, the gate driver may have two outputs for driving a high-side power transistor and a low-side power transistor, respectively.

In a gate driver for driving a high-side power transistor, a charge pump converter may be employed to provide bias power for switching the high-side power transistor. More particularly, the charge pump converter is connected between a power source and a bias input terminal of the gate driver. The charge pump converter is configured to convert the output voltage of the power source into a higher voltage, which is used to drive the high-side power transistor.

In operation, the power losses may be not evenly distributed among different switches of the charge pump converter. It would be desirable to have a simple and reliable control method to evenly distribute the power losses among different switches of the charge pump converter, thereby improving the performance of the charge pump converter.

SUMMARY

In accordance with an embodiment, an apparatus comprises a first switching device and a second switching device connected in series between a first node and a second node, a first voltage blocking device and a second voltage blocking device connected in series between the first node and a third node, a flying capacitor connected between a common node of the first switching device and the second switching device, and a common node of the first voltage blocking device and the second voltage blocking device, and a controller configured to adjust power losses in the first switching device and the second switching device through controlling charge and discharge processes of the flying capacitor.

In accordance with another embodiment, a method comprises configuring a charge pump converter to operate in a charge mode, wherein a power source is configured to charge a flying capacitor of the charge pump converter, and operate in a discharge mode to transfer energy from the flying capacitor to a load connected to the charge pump converter, detecting a terminal voltage of the flying capacitor, detecting at least one of an input voltage and an output voltage of the charge pump converter, and applying either the charge mode or the discharge mode to the flying capacitor based on a comparison between the terminal voltage of the flying capacitor and the at least one of an input voltage and an output voltage of the charge pump converter.

In accordance with yet another embodiment, a method comprises configuring a charge pump converter to convert an input voltage from a power source to a higher voltage, wherein the charge pump converter comprises a first switch, a second switch, a third switch and a fourth switch connected in series between two terminals of the power source, a first voltage blocking device and a second voltage blocking device connected in series between an input terminal and an output terminal of the charge pump converter, and a flying capacitor connected between a common node of the second switch and the third switch, and a common node of the first voltage blocking device and the second voltage blocking device.

The method further comprises detecting a first voltage on the common node of the second switch and the third switch, and applying either a charge process or a discharge process to the flying capacitor based on a comparison between the first voltage on the common node of the second switch and the third switch and an input/output voltage of the charge pump converter.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a control method for balancing power losses in two power switches of a charge pump converter. The present disclosure may also be applied, however, to a variety of power converters. Hereinafter, various embodiments will be explained in detail with reference to the accompanying drawings.

Figure 1:
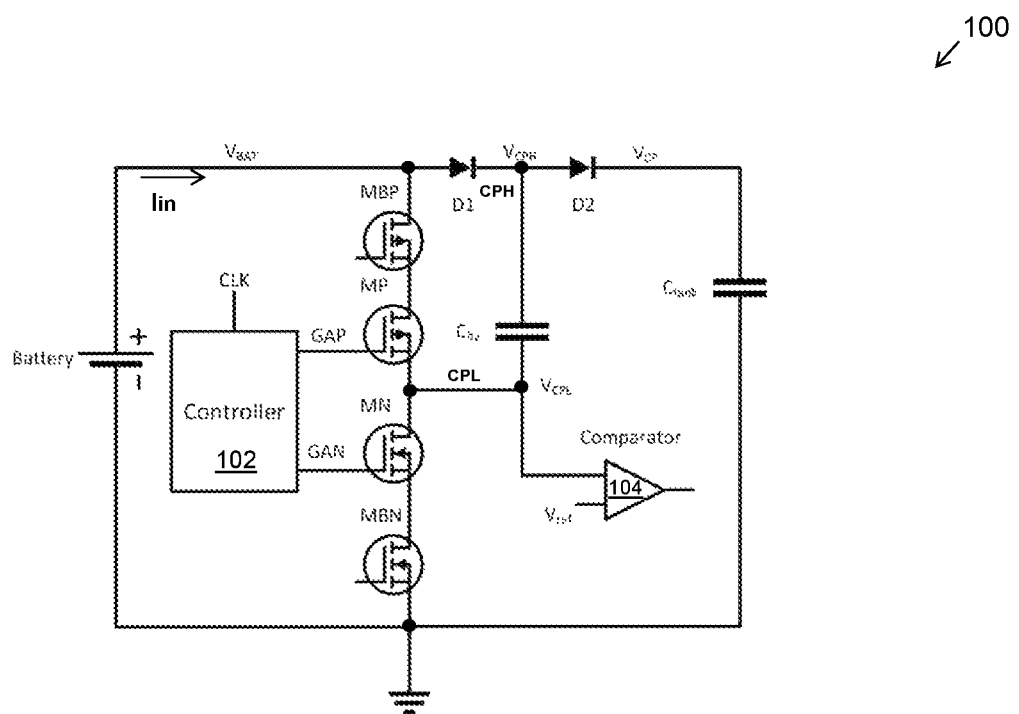
FIG. 1 illustrates a schematic diagram of a charge pump converter in accordance with various embodiments of the present disclosure.

FIG. 1 illustrates a schematic diagram of a charge pump converter in accordance with various embodiments of the present disclosure. The charge pump converter 100 comprises a first switch MBP, a second switch MP, a third switch MN, a fourth switch MBN, a capacitor $C_{fly}$, a first diode D1, a second diode D2 and an output capacitor $C_{tank}$. The input of the charge pump converter 100 is connected to a power source. In some embodiments, the power source is implemented as a battery. The output voltage of the battery is denoted as $V_{BAT}$ as shown in FIG. 1. The input voltage bus of the charge pump converter 100 is connected to the power source. The output capacitor $C_{tank}$ is connected between an output voltage bus of the charge pump converter 100 and ground. In some embodiments, the output voltage bus is connected to a load such as a gate driver. The voltage on the output voltage bus is denoted as $V_{CP}$ as shown in FIG. 1.

As shown in FIG. 1, the first switch MBP, the second switch MP, the third switch MN and the fourth switch MBN are connected in series between the input voltage bus of the charge pump converter 100 and ground. Throughout the description, the input voltage bus of the charge pump converter 100 and ground may be alternatively referred to as a first node and a second node, respectively. The output voltage bus of the charge pump converter 100 may be alternatively referred to as a third node. As shown in FIG. 1, the first node is connected to a positive terminal of the battery. The second node is connected to a negative terminal of the battery.

A common node of the second switch MP and the third switch MN is denoted as CPL as shown in FIG. 1. Throughout the description, the voltage on the first node may be alternatively referred to as a first voltage potential. The voltage on CPL may be alternatively referred to as a second voltage potential. The first diode D1 and the second diode D2 are connected in series between the input voltage bus and the output voltage bus of the charge pump converter 100. More particularly, the anode of the first diode D1 is connected to the input voltage bus. The cathode of the first diode D1 is connected to an anode of the second diode D2. The cathode of the second diode D2 is connected to the output voltage bus. A common node of the first diode D1 and the second diode D2 is denoted as CPH. Throughout the description, the first diode D1 and the second diode D2 are alternatively referred to as a first blocking device and a second blocking device, respectively.

As shown in FIG. 1, the capacitor $C_{fly}$ is connected between CPH and CPL. In some embodiments, the capacitor $C_{fly}$ functions as a charge pump capacitor. The charge pump capacitor is often referred to as a flying capacitor. Throughout the description, the capacitor $C_{fly}$ is alternatively referred to as a flying capacitor. In a steady state operation mode, the voltage across the flying capacitor $C_{fly}$ is adjustable through applying either a charge mode or a discharge mode to the flying capacitor $C_{fly}$.

In operation, when the third switch MN and the fourth switch MBN are turned on, and the first switch MBP and the second switch MP are turned off, the charge pump converter 100 is configured to operate in the charge mode. The power from the battery charges the flying capacitor $C_{fly}$ through a first conductive path formed by the first diode D1, the third switch MN and the fourth switch MBN. During the charge mode, the second diode D2 is reverse-biased. The fourth switch MBN functions as a current limiting device configured to limit the power losses in the third switch MN. During the charge mode, the power loss in the third switch MN can be expressed as:

$$P_{loss\_MN} = V_{CPL} \times I_{in} \qquad (1)$$

where $I_{in}$ is the current flowing from the battery to the charge pump converter 100, and $V_{CPL}$ is the voltage on the node CPL.

In operation, when the first switch MBP and the second switch MP are turned on, and the third switch MN and the fourth switch MBN are turned off, the charge pump converter 100 is configured to operate in the discharge mode. The battery and the flying capacitor $C_{fly}$ are combined together to provide power for the load through a second conductive path formed by the first switch MBP, the second switch MP and the second diode D2. During the discharge mode, the first diode D1 is reverse-biased. The first switch MBP functions as a current limiting device configured to limit the power losses in the second switch MP. During the discharge mode, the power loss in the second switch MP can be expressed as:

$$P_{loss\_MP} = (V_{BAT} - V_{CPL}) \times I_{in} \quad (2)$$

Equations (1) and (2) above shows the power losses in the second switch MP and the third switch MN are related to the voltage ($V_{CPL}$) on the node CPL. In particular, the power loss in the third switch MN is proportional to $V_{CPL}$. On the other hand, the power loss in the second switch MP is proportional to the difference between $V_{BAT}$ and $V_{CPL}$ ($V_{BAT}-V_{CPL}$). In order to balance the power loss distribution between the second switch MP and the third switch MN, $V_{CPL}$ is regulated to a predetermined voltage during the charge mode and the discharge mode. In some embodiments, $V_{CPL}$ is regulated to a voltage of about one half of the battery voltage $V_{BAT}$.

In accordance with an embodiment, the switches (e.g., switches MBP, MP, MN and MBN) shown in FIG. 1 may be metal oxide semiconductor field-effect transistor (MOSFET) devices. Alternatively, the switching element can be any controllable switches such as insulated gate bipolar transistor (IGBT) devices, integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices, silicon carbide (SiC) based power devices and the like.

It should be noted while FIG. 1 shows the switches MBP and MP are implemented as p-type transistors, and the switches MBN and MN are implemented as n-type transistors, a person skilled in the art would recognize there may be many variations, modifications and alternatives. For example, depending on different applications and design needs, the switches MBP and MP may be implemented as n-type transistors. Furthermore, each switch shown in FIG. 1 may be implemented as a plurality of switches connected in parallel. Moreover, a capacitor may be connected in parallel with one switch to achieve zero voltage switching (ZVS)/zero current switching (ZCS).

FIG. 1 further illustrates a controller 102 and a comparator 104. The controller 102 may be implemented as any suitable controllers such as a microprocessor, a digital signal processor (DSP), an analog controller, any combinations thereof and the like. The controller 102 detects various operating parameters (e.g., the input voltage, the output voltage, the voltage across the flying capacitor, the load current, any combinations thereof and the like). Based upon the detected operating parameters, the controller 102 determines the gate drive signals GAP and GAN of switches MP and MN as shown in FIG. 1. In some embodiments, the first switch MBP and the second switch MP are turned on/off at the same time. The duty cycle of the gate drive signal of the first switch MBP is the same as that of the second switch MP. Likewise, the third switch MN and the fourth switch MBN are turned on/off at the same time. The duty cycle of the gate drive signal of the fourth switch MBN is the same as that of the third switch MN.

In some embodiments, a first input of the comparator 104 is configured to detect the voltage ($V_{CPL}$) on the common node of the second switch MP and the third switch MN. A second input of the comparator 104 is configured to receive a predetermined reference $V_{ref}$. The comparison result generated by the comparator 104 is fed into the controller 102.

The controller 102 generates the gate drive signals GAP and GAN based on the comparison result and a clock signal CLK.

In operation, the second switch MP and the third switch MN are turned on and off in an alternating manner to pump the power from the battery to the capacitor $C_{tank}$. The charge pump converter 100 helps to establish a higher voltage (greater than $V_{BAT}$) at the output of the charge pump converter 100. The first switch MBP and the fourth switch MBN are used to limit the currents flowing through the second switch MP and the third switch MN, respectively. In particular, the first switch MBP is configured as a first current limiting circuit to control a first current flowing through the second switch MP during the discharge process to the flying capacitor. The fourth switch MBN is configured as a second current limiting circuit to control a second current flowing through the third switch MN during the charge process applied to the flying capacitor.

In some embodiments, the first switch MBP is configured as a first current source to limit a first current flowing through the second switch MP. Likewise, the fourth switch MBN is configured as a second current source to limit a second current flowing through the third switch MN.

In some embodiments, the currents flowing through first switch MBP and the fourth switch MBN may be controlled by two current mirrors coupled to the first switch MBP and the fourth switch MBN, respectively. Using current mirrors to control the currents flowing through power switches is well known in the art, and hence is not discussed herein.

The charge pump converter 100 is capable of regulating the voltage $V_{CPL}$ through the control circuit formed by the comparator 104 and the controller 102. In operation, when the voltage $V_{CPL}$ is less than the predetermined reference $V_{ref}$, the controller 102 turns on the second switch MP and applies the discharge mode to the flying capacitor $C_{fly}$. As a result of applying the discharge mode, the voltage across the flying capacitor $C_{fly}$ is reduced, thereby increasing the voltage $V_{CPL}$. On the other hand, when the voltage $V_{CPL}$ is greater than the predetermined reference $V_{ref}$, the controller 102 turns on the third switch MN and applies the charge mode to the flying capacitor $C_{fly}$. As a result of applying the charge mode, the voltage across the flying capacitor $C_{fly}$ is increased, thereby reducing the voltage $V_{CPL}$.

Depending on different operating conditions, the charge pump converter 100 may operate either in the charge mode or the discharge mode. Through the control mechanism described above, the voltage $V_{CPL}$ may be regulated to a voltage level approximately equal to $V_{ref}$. In some embodiments, $V_{ref}$ is equal to one half of the battery voltage $V_{BAT}$. Throughout the description, this control mechanism (regulating $V_{CPL}$ to a predetermined voltage level) is alternatively referred to as an adaptive duty cycle control mechanism.

Figure 2:
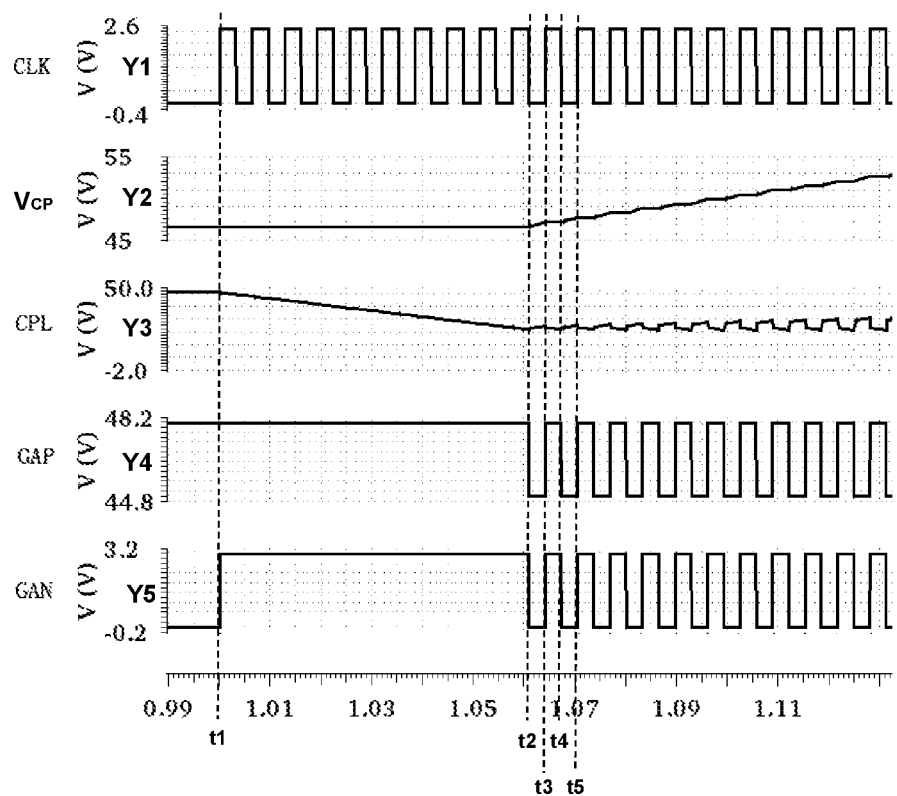
FIG. 2 illustrates a timing diagram of the charge pump converter shown in FIG. 1 in accordance with various embodiments of the present disclosure.

FIG. 2 illustrates a timing diagram of the charge pump converter shown in FIG. 1 in accordance with various embodiments of the present disclosure. The horizontal axis of FIG. 2 represents intervals of time. There are five vertical axes. The first vertical axis Y1 represents the clock signal CLK fed into the controller 102. The second vertical axis Y2 represents the output voltage $V_{CP}$ of the charge pump converter 100. The third vertical axis Y3 represents the voltage on the node CPL. The four vertical axis Y4 represents the gate drive signal GAP of the second switch MP. The fifth vertical axis Y5 represents the gate drive signal GAN of the third switch MN.

Prior to a first time instant t1, the clock signal CLK is not applied to the controller 102. As shown in FIG. 2, the output voltage $V_{CP}$ is about 48 V. The voltage on the node CPL is about 48 V. The gate drive signal GAP is of a logic high state. Since the second switch MP is a p-type transistor and GAP is of the logic high state, the second switch MP is turned off. The gate drive signal GAN is of a logic low state. Since the third switch MN is an n-type transistor and GAN is of the logic low state, the third switch MN is turned off.

From the first time instant t1 to a second time instant t2, the clock signal CLK is applied to the controller 102. In response to the clock signal CLK, the gate drive signal GAN is of a logic high state. As a result, the third switch MN (n-type transistor) is turned on. The turn-on of the third switch MN provides a charge path for the flying capacitor $C_{fly}$. After the flying capacitor $C_{fly}$ has been charged, the voltage at the node CPL decreases in a linear manner from t1 to t2 as shown in FIG. 2. From t1 to t2, the output voltage VCP remains the same.

From the second time instant t2, the controller 102 applies the charge mode and the discharge mode to the flying capacitor $C_{fly}$ in an alternating manner. From the second time instant t2 to a third time instant t3, the gate drive signal GAP is of a logic low state. As a result, the second switch MP (p-type transistor) is turned on. The gate drive signal GAN is of a logic low state. As a result, the third switch MN (n-type transistor) is turned off. The turn-on of the second switch MP provides a discharge path for the flying capacitor $C_{fly}$. More particularly, the flying capacitor $C_{fly}$ and the battery are connected in series to provide power for the output capacitor $C_{tank}$ through the second diode D2. From t2 to t3, the output voltage $V_{CP}$ increases accordingly as shown in FIG. 2. During the discharge mode (from t2 to t3), the voltage across the flying capacitor decreases. The voltage on the node CPL increases shown in FIG. 2.

From the third time instant t3 to a fourth time instant t4, the gate drive signal GAP is of a logic high state. As a result, the second switch MP (p-type transistor) is turned off. The gate drive signal GAN is of a logic high state. As a result, the third switch MN (n-type transistor) is turned on. The turn-on of the third switch MN provides a charge path for the flying capacitor $C_{fly}$. More particularly, the battery charges the flying capacitor $C_{fly}$ through the first diode D1, the third switch MN and the fourth switch MBN. The second diode D2 is reverse-biased. From t3 to t4, the output voltage $V_{CP}$ remains the same as shown in FIG. 2. During the charge mode (from t3 to t4), the voltage across the flying capacitor $C_{fly}$ increases. The voltage on the node CPL decreases as shown in FIG. 2.

From the fourth time instant t4 to a fifth time instant t5, the discharge mode is applied to the charge pump converter 100 again. The electrical characteristics during t4 to t5 are similar to the electrical characteristics during t2 to t3, and hence are not discussed herein.

From the fifth time instant t5, the charge mode and the discharge mode are applied to the flying capacitor $C_{fly}$ in an alternating manner. The output voltage $V_{CP}$ reaches a voltage level of about 53 V. The voltage on the node CPL is about 24 V. It should be noted that the voltage above (24 V) is merely an example. Depending on different applications and design needs, the voltage on the node CPL may vary accordingly.

It should be noted that the output voltage $V_{CP}$ shown in FIG. 2 is merely an example. Depending on different applications and design needs, the output voltage $V_{CP}$ may be reduced by controlling the second switch MP and the third switch MN. For example, when the output voltage $V_{CP}$ is over a predetermined voltage threshold, the output voltage $V_{CP}$ may be reduced by turning off both the second switch MP and the third switch MN. By applying this control scheme, the output voltage $V_{CP}$ may be regulated at the predetermined voltage threshold.

Referring back to FIG. 1, in some embodiments, the input voltage is about 48 V. The voltage on the node CPL may be controlled under different control mechanisms. Under a first control mechanism, the voltage on the node CPL is unregulated. The power losses are not evenly distributed between the second switch MP and the third switch MN. In some embodiments, the power loss in the third switch MN is much greater than the power loss in the second switch MP. Under a second control mechanism, the voltage on the node CPL is regulated to a voltage of about 32 V. The power losses are not evenly distributed between the second switch MP and the third switch MN. In some embodiments, the power loss in the third switch MN is greater than the power loss in the second switch MP. Under a third control mechanism, the voltage on the node CPL is regulated to a voltage of about 24 V. The power losses are substantially evenly distributed between the second switch MP and the third switch MN. In some embodiments, the power loss in the third switch MN is approximately equal to the power loss in the second switch MP. The detailed power loss distributions under different control mechanisms will be discussed below with respect to FIG. 3.

It should be noted that implementing MPP and MP as p-type transistors and MN and MBN as n-type transistor in the previous example are selected purely for demonstration purposes and are not intended to limit the various embodiments of the present disclosure to any particular transistor type or configuration. For example, if a negative power supply is employed to provide power to the charge pump converter, MBP and MP can be implemented as n-type transistors, and MN and MBN can be implemented as p-type transistors.

Figure 3:
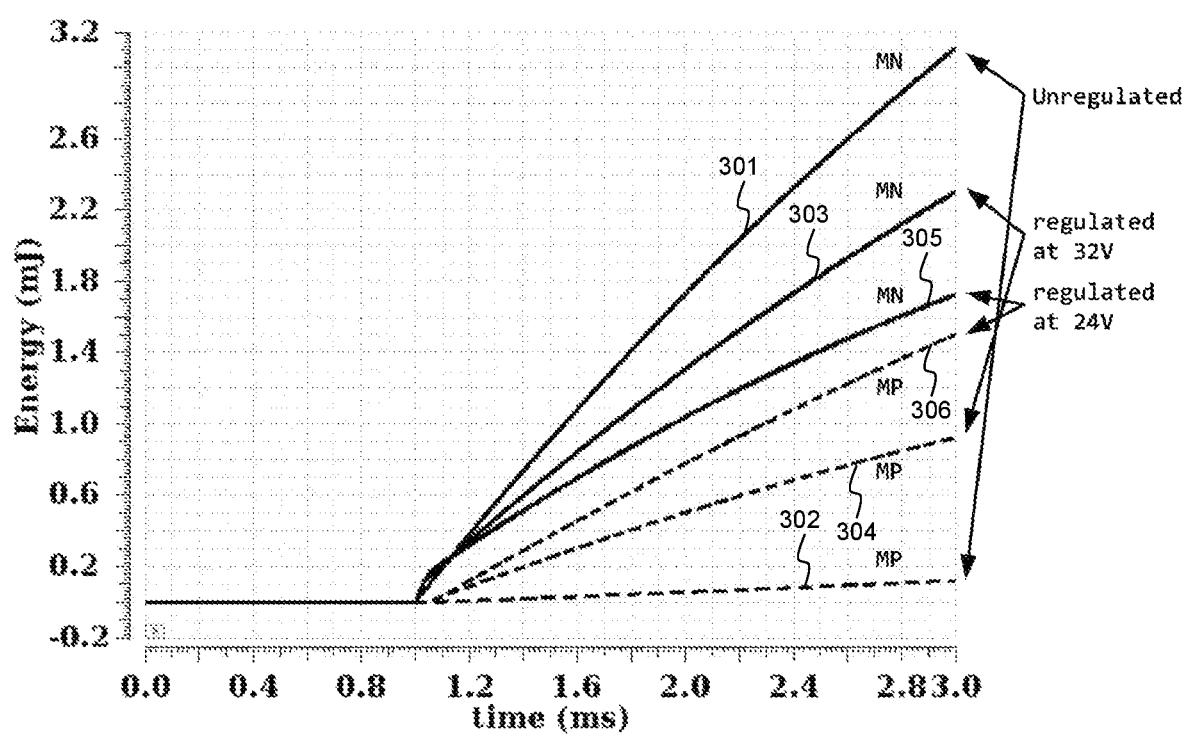
FIG. 3 illustrates power loss distributions under different control mechanisms in accordance with various embodiments of the present disclosure.

FIG. 3 illustrates power loss distributions under different control mechanisms in accordance with various embodiments of the present disclosure. The horizontal axis of FIG. 3 represents intervals of time. The vertical axis represents the energy losses in the second switch MP and the third switch MN. It should be noted that the energy losses are equal to the power losses in the switches multiplied by a specified time period.

A first line 301 represents the energy loss in the third switch MN when the voltage on the node CPL is unregulated. A second line 302 represents the energy loss in the second switch MP when the voltage on the node CPL is unregulated. As shown in FIG. 3, the energy loss in the third switch MN is up to 30.2 millijoule (mJ). In contrast, the energy loss in the second switch MP is about 0.1 mJ.

A third line 303 represents the energy loss in the third switch MN when the voltage on the node CPL is regulated to a voltage of about 32 V. A fourth line 304 represents the energy loss in the second switch MP when the voltage on the node CPL is regulated to 32 V. As shown in FIG. 3, the energy loss in the third switch MN is up to 2.3 mJ. In contrast, the energy loss in the second switch MP is about 0.9 mJ.

A fifth line 305 represents the energy loss in the third switch MN when the voltage on the node CPL is regulated to 24 V. A sixth line 306 represents the energy loss in the second switch MP when the voltage on the node CPL is regulated to 24 V. As shown in FIG. 3, the energy loss in the third switch MN is up to 1.7 mJ. In contrast, the energy loss in the second switch MP is about 1.5 mJ.

One advantageous feature of regulating the voltage on the node CPL to a voltage of about 24 V is the energy losses are evenly distributed between the second switch MP and the third switch MN.

It should be noted the power losses in the second switch MP and the third switch MN may not be distributed evenly. For example, in some applications, the die size of the second switch MP may be much bigger than that of the third switch MN. As a result of having a larger die size, the second switch MP is able to dissipate more heat. As such, it is possible to distribute the power losses unevenly between the second switch MP and the third switch MN.

Figure 4:
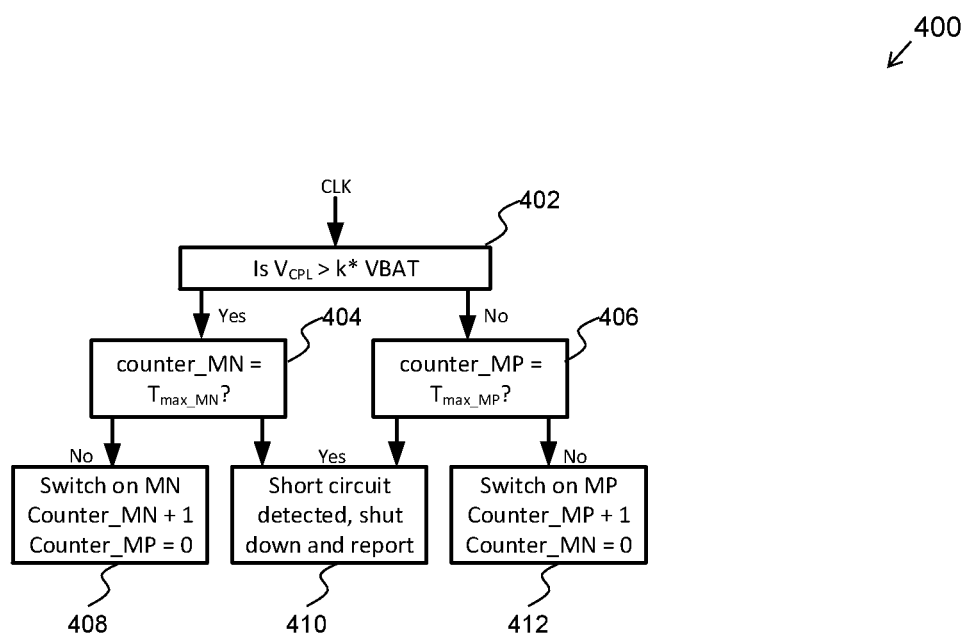
FIG. 4 illustrates a flow chart of a method for controlling the charge pump converter shown in FIG. 1 in accordance with various embodiments of the present application.

FIG. 4 illustrates a flow chart of a method for controlling the charge pump converter shown in FIG. 1 in accordance with various embodiments of the present application. This flowchart shown in FIG. 4 is merely an example, which should not unduly limit the scope of the claims. One of ordinary skill in the art would recognize many variations, alternatives, and modifications. For example, various steps illustrated in FIG. 4 may be added, removed, replaced, rearranged and repeated.

Referring back to FIG. 3, the energy losses in the second switch MP and the third switch MN are not evenly distributed as indicated by lines 301-304. Regulating the voltage on the node CPL to a predetermined voltage (e.g., 24 V) helps to evenly distribute the energy losses, thereby improving the reliability of the charge pump converter. FIG. 4 illustrates a control method 400 to regulate the voltage on the node CPL to a predetermined voltage so as to achieve a balanced power loss distribution between the second switch MP and the third switch MN.

Prior to the control method 400 starting at step 402, a clock signal CLK is fed into the controller 102 shown in FIG. 1. In response to the clock signal, the switches MBP, MP, MN and MBN start to switch. As shown in FIG. 2, the voltage on the node CPL varies in response to the charge mode and the discharge mode applied to the flying capacitor $C_{fly}$. In addition, a first counter (counter_MN) and a second counter (counter_MP) are employed to find whether a fault occurs in the charge pump converter 100. Initially, both the first counter and the second counter are set to zero. For the first counter, a predetermined maximum number of consecutive MN turn-on cycles may be selected. This maximum number is equal to $T_{max\_MN}$ (maximum consecutive MN turn-on time) multiplied by the switching frequency ($f_{clk}$) of the clock signal CLK. The predetermined maximum number of consecutive MN turn-on cycles is employed to determine whether a fault occurs. $T_{max\_MN}$ is given by the following equation:

$$T_{MAX\_MN} = (V_{BAT} - V_{ref}) \times C_{fly} / I_{MN} \qquad (3)$$

where $I_{MN}$ is the current limit of the third switch MN.

For the second counter, a predetermined maximum number of consecutive MP turn-on cycles is employed to determine whether a fault occurs. The predetermined maximum number of consecutive MP turn-on cycles is equal to three. In operation, after $V_{CPL}$ has reached a desired voltage level, the second switch MP is turned on for the first time. The duty cycle of the second switch MP is determined by $I_{MN}/(I_{MN}+I_{MP})$. $I_{MN}$ is the maximum current flowing through the third switch MN. $I_{MP}$ is the maximum current flowing through the second switch MP. In some embodiments, the duty cycle of the second switch MP is about 50%. Due to operating parameter variations, the duty cycle of the second switch MP may vary to a level over 50%. The largest duty cycle of the second switch MP is about 60%. As such, the second switch MP cannot be switched on three consecutive cycles. If the second switch MP is switched on three consecutive cycles, a fault occurs (e.g., the node CPL is shorted to ground).

At step 402, the voltage on the node CPL is detected and compared with a predetermined reference. Throughout the description, the predetermined reference may be alternatively referred to as a predetermined threshold. In some embodiments, the predetermined reference is equal to k times the battery voltage where k is a predetermined parameter. In some embodiments, k is equal to 0.5. Also at step 402, if the detected voltage ($V_{CPL}$) is greater than the predetermined reference, the method 400 proceeds to step 404. Otherwise, the method 400 proceeds to step 406.

At step 404, the consecutive MN turn-on time is checked. If the consecutive MN turn-on time is equal to or greater than $T_{max\_MN}$, the method 400 proceeds to step 410 where a fault is reported and the charge pump converter 100 is shut down. Also at step 404, if the consecutive MN turn-on time is less than $T_{max\_MN}$, the method 400 proceeds to step 408.

One advantageous feature of having steps 404 and 410 is the first counter is employed to count a consecutive charge time of the flying capacitor, and report the fault upon detecting that the consecutive charge time of the flying capacitor is greater than a predetermined maximum charge time.

At step 408, the third switch MN is turned on. As a result of turning on the third switch MN, the charge mode is applied to the flying capacitor $C_{fly}$. The voltage on the node CPL is reduced accordingly. Also at step 408, the first counter (counter_MN) is increased by 1. The second counter (counter_MP) is reset to zero. After executing step 408, the control method 400 returns to step 402.

At step 406, the consecutive MP turn-on time is checked. If the consecutive MP turn-on time is equal to or greater than $T_{max\_MP}$, the method 400 proceeds to step 410 where a fault is reported and the charge pump converter 100 is shut down. Also at step 406, if the consecutive MP turn-on time is less than $T_{max\_MP}$, the method 400 proceeds to step 412.

One advantageous feature of having steps 406 and 410 is the second counter is employed to count a consecutive discharge time of the flying capacitor, and report the fault upon detecting that the consecutive discharge time of the flying capacitor is greater than a predetermined maximum discharge time.

At step 412, the second switch MP is turned on. As a result of turning on the second switch MP, the discharge mode is applied to the flying capacitor $C_{fly}$. The voltage on the node CPL is increased accordingly. Also at step 412, the second counter (counter_MP) is increased by 1. The first counter (counter_MN) is reset to zero. After executing step 412, control method 400 returns to step 402.

Figure 5:
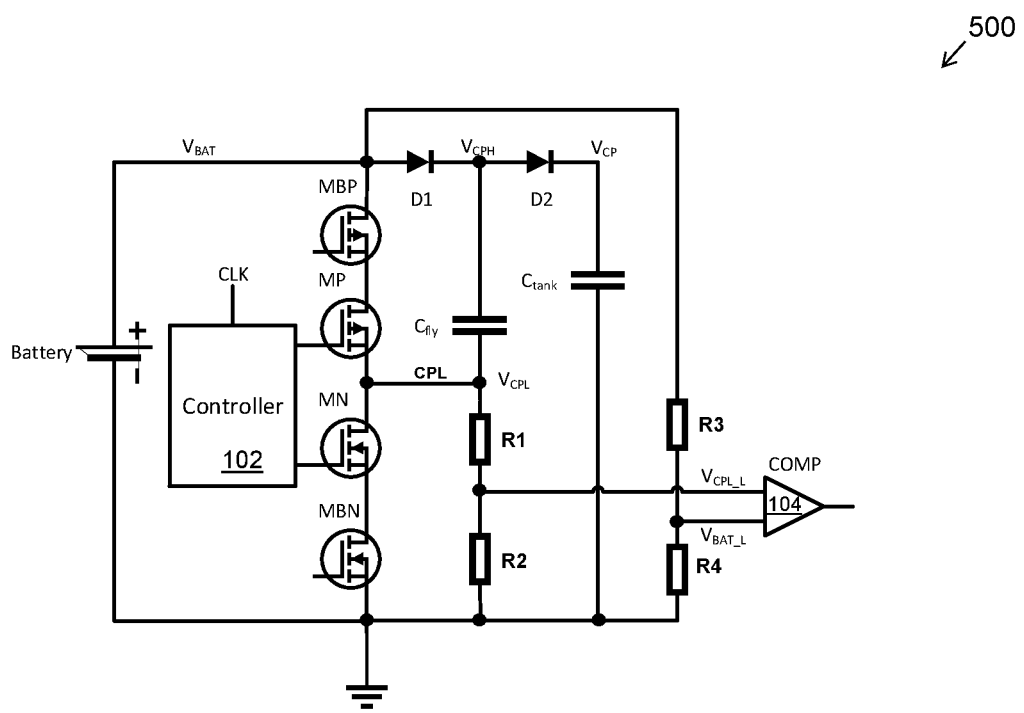
FIG. 5 illustrates a schematic diagram of a first implementation of the feedback circuit of the charge pump converter shown in FIG. 1 in accordance with various embodiments of the present disclosure.

FIG. 5 illustrates a schematic diagram of a first implementation of the feedback circuit of the charge pump converter shown in FIG. 1 in accordance with various embodiments of the present disclosure. The charge pump converter 500 shown in FIG. 5 is similar to the charge pump converter 100 shown in FIG. 1 except that two resistor dividers are employed to detect the battery voltage and the voltage on the node CPL respectively.

As shown in FIG. 5, a first resistor divider comprises resistors R1 and R2 connected in series between the node CPL and ground. A common node of the resistors R1 and R2 is connected to a first input of the comparator 104. A second resistor divider comprises resistors R3 and R4 connected in series between the input voltage bus of the charge pump converter 500 and ground. A common node of the resistors R3 and R4 is connected to a second input of the comparator 104. The first resistor divider is employed to scale down the voltage on the node CPL to a suitable voltage level ($V_{CPL\_L}$) fed into the first input of the comparator 104. The voltage $V_{CPL\_L}$ can be expressed as:

$$V_{CPL\_L} = k1 \times V_{CPL} \qquad (4)$$

where k1 is a predetermined parameter. In some embodiments, k1 is equal to 1/20.

The second resistor divider is employed to scale down the voltage on the input voltage bus of the charge pump converter 50 to a suitable voltage level ($V_{BAT\_L}$) fed into the second input of the comparator 104. The voltage $V_{BAT\_L}$ can be expressed as:

$$V_{BAT\_L} = k2 \times V_{BAT} \qquad (5)$$

where k2 is a predetermined parameter. In some embodiments, k2 is equal to 1/40.

It should be noted that k shown in FIG. 4 is equal to k2/k1. In some embodiments, k2 is equal to 1/40, and k1 is equal to 1/20. Hence, k is equal to 0.5. Alternatively, other ratios could be used depending on different applications and design needs.

The detected battery voltage ($V_{BAT\_L}$) and the detected CPL voltage ($V_{CPL\_L}$) are compared at the comparator 104. The comparison result is used to determine which mode (a charge mode or a discharge mode) is applied to the flying capacitor $C_{fly}$ as discussed above with respect to FIG. 4.

Figure 6:
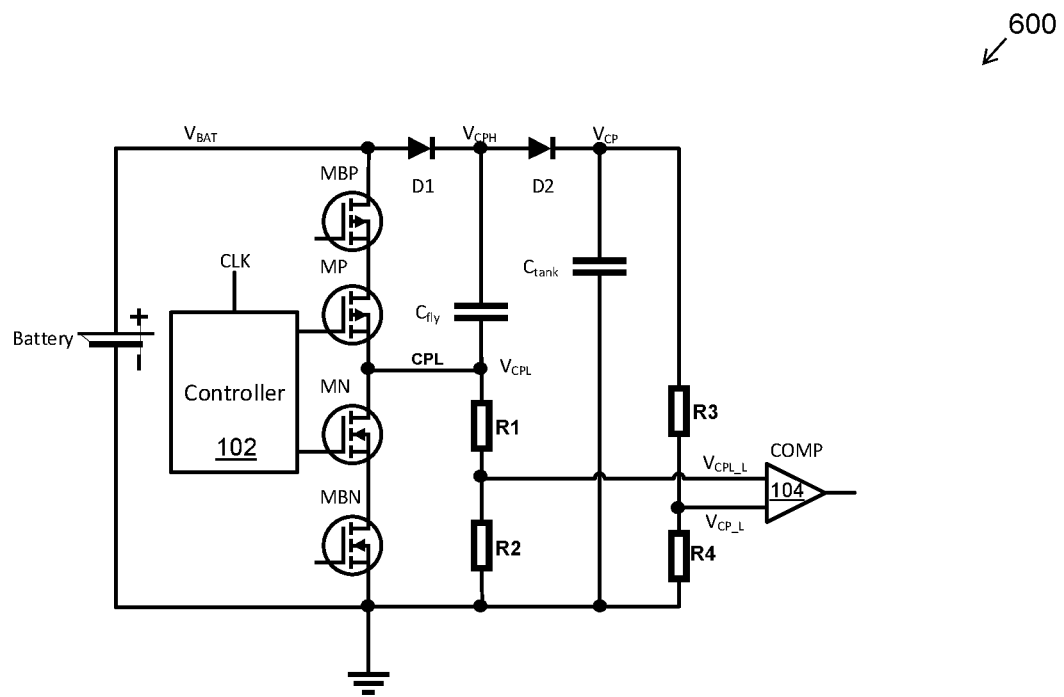
FIG. 6 illustrates a schematic diagram of a second implementation of the feedback circuit of the charge pump converter shown in FIG. 1 in accordance with various embodiments of the present disclosure.

FIG. 6 illustrates a schematic diagram of a second implementation of the feedback circuit of the charge pump converter shown in FIG. 1 in accordance with various embodiments of the present disclosure. The charge pump converter 600 shown in FIG. 5 is similar to the charge pump converter 500 shown in FIG. 5 except that the second resistor divider is connected between the output voltage bus of the charge pump converter 600 and ground. In other words, the output voltage of the charge pump converter 600 is used as a reference to determine which mode (a charge mode or a discharge mode) is applied to the flying capacitor $C_{fly}$ as discussed above with respect to FIG. 4.

Figure 7:
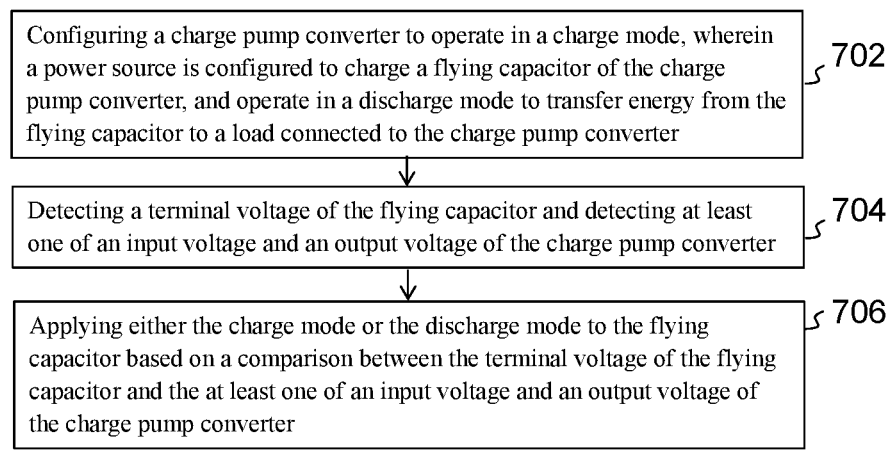
FIG. 7 illustrates a flow chart of a method for controlling the charge pump converters shown in FIG. 1 in accordance with various embodiments of the present disclosure.

FIG. 7 illustrates a flow chart of a method for controlling the charge pump converters shown in FIG. 1 in accordance with various embodiments of the present disclosure. This flowchart shown in FIG. 7 is merely an example, which should not unduly limit the scope of the claims. One of ordinary skill in the art would recognize many variations, alternatives, and modifications. For example, various steps illustrated in FIG. 7 may be added, removed, replaced, rearranged and repeated.

At step 702, a charge pump converter is configured to operate in a charge mode and a discharge mode in an alternating manner. During the charge mode, a power source charges the flying capacitor of the charge pump converter. During the discharge mode, the energy stored in the flying capacitor is transferred to a load connected to the charge pump converter.

At step 704, a suitable voltage sensing circuit is configured to detect a terminal voltage of the flying capacitor and at least one of the input voltage and the output voltage of the charge pump converter. Referring back to FIG. 1, the flying capacitor is connected between a common node of D1 and D2, and the node CPL. In some embodiments, the voltage on the node CPL and the input voltage of the charge pump converter are detected. In alternative embodiments, the voltage on the node CPL and the output voltage of the charge pump converter are detected.

At step 706, the detected CPL voltage and the at least one of the input voltage and the output voltage of the charge pump converter are compared at a suitable device such as a comparator. Based upon the comparing result, either the charge mode or the discharge mode is applied to the flying capacitor.

Figure 8:
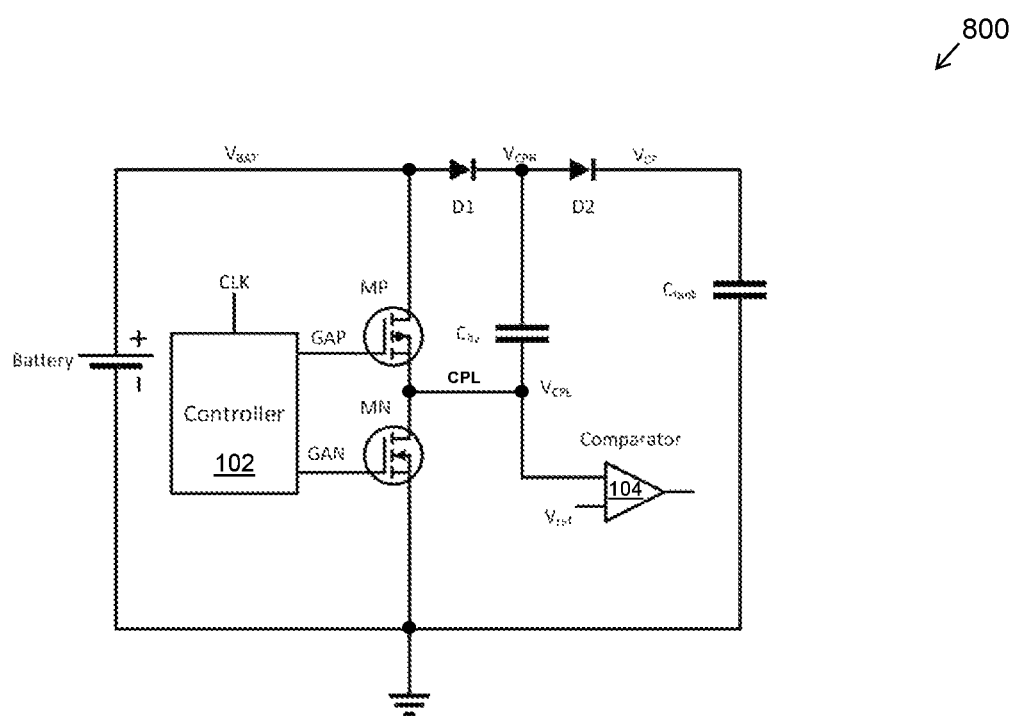
FIG. 8 illustrates a schematic diagram of another charge pump converter in accordance with various embodiments of the present disclosure.

FIG. 8 illustrates a schematic diagram of another charge pump converter in accordance with various embodiments of the present disclosure. The charge pump converter Boo is similar to the charge pump converter 100 shown in FIG. 1 except that the charge pump converter Boo does not include the current limiting devices MBP and MBN. The operating principle of the charge pump converter Boo is similar to that of the charge pump converter 100, and hence is not discussed again herein.

Figure 9:
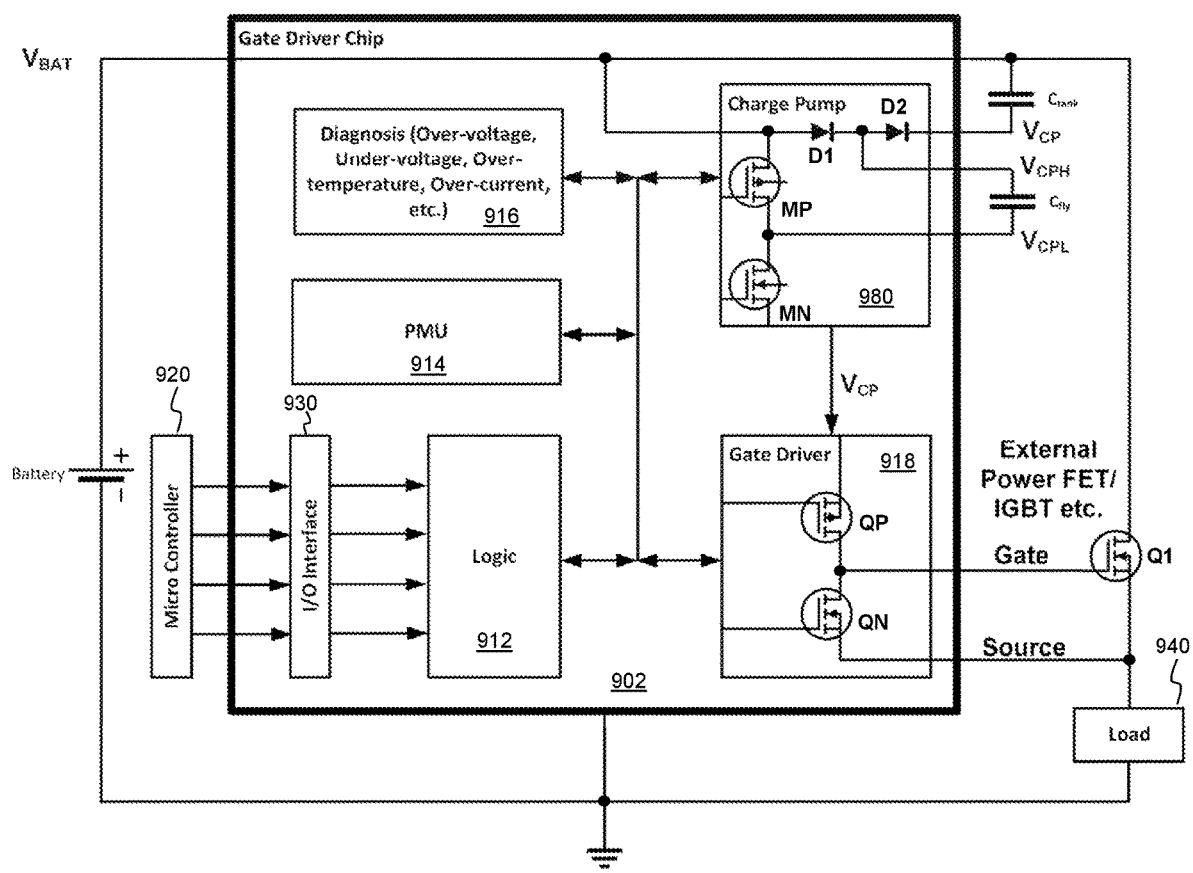
FIG. 9 illustrates a system diagram of a gate driver in accordance with various embodiments of the present disclosure.

FIG. 9 illustrates a system diagram of a gate driver in accordance with various embodiments of the present disclosure. As shown in FIG. 9, the gate driver 902 includes a charge pump converter 980, a gate drive block 918, a diagnosis block 916, a power management unit (PMU) 914, a logic block 912 and an input/output (I/O) interface 930. The gate driver 902 is configured to generate a gate drive signal applied to a switch Q1.

As shown in FIG. 9, the switch Q1 is connected between a battery and a load 940. The switch Q1 functions as a load switch. As shown in FIG. 9, the switch Q1 is implemented as an n-type MOSFET. The drain of the switch Q1 is connected to the positive terminal of the battery. The source of the switch Q1 is connected to the load 940. The gate of the switch Q1 is connected to the gate drive block 918.

It should be noted that implementing Q1 as an n-type MOSFET is merely an example, which should not unduly limit the scope of the claims. One of ordinary skill in the art would recognize many variations, alternatives, and modifications. For example, Q1 may be implemented as an IGBT.

As shown in FIG. 9, a microcontroller 920 is configured to generate a plurality of control signals based on a variety of operating parameters. The control signals are fed into the I/O interface 930. The I/O interface 930 converts the control signals into suitable logic signals. The logic signals are fed into the logic block 912. Based on predetermined control mechanisms, the logic block 912 generates a plurality of signals for driving the gate drive block 918 and the charge pump converter 980. Furthermore, the logic block 912 exchanges control and protection information with the PMU 914 and the diagnosis block 916.

The gate drive block 918 comprises a p-type transistor QP and an n-type transistor QN connected in series between a voltage bus $V_{CP}$ and the source of the switch Q1. The gates of the p-type transistor QP and the n-type transistor QN are controlled by the output signals of the logic block 912. It should be noted, under abnormal operating conditions, the outputs of the diagnosis block 916 and the PMU 914 may have an impact on the operation of the gate drive block 918. For example, under a short circuit, the diagnosis block 916 and the PMU 914 may shut down the gate drive block 918 to protect the switch Q1.

The charge pump converter 980 is similar to the charge pump converter Boo shown in FIG. 8 except that the output capacitor $C_{tank}$ is connected between $V_{BAT}$ and the output of the charge pump converter 980. In other words, the output voltage $V_{CP}$ is established with reference to the battery voltage $V_{BAT}$. The charge pump converter 980 is configured to provide an output voltage higher than the battery voltage. The output voltage $V_{CP}$ of the charge pump converter Boo is employed to provide bias power for the gate drive block 918.

FIG. 9 shows the bias power of the gate drive block 918 is provided by the charge pump converter 980. This is merely an example, which should not unduly limit the scope of the claims. One of ordinary skill in the art would recognize many variations, alternatives, and modifications. For example, the charge pump converter 980 can be replaced by any charge pump converters (e.g., the charge pump converter 100 shown in FIG. 1) in the present disclosure.

Figure 10:
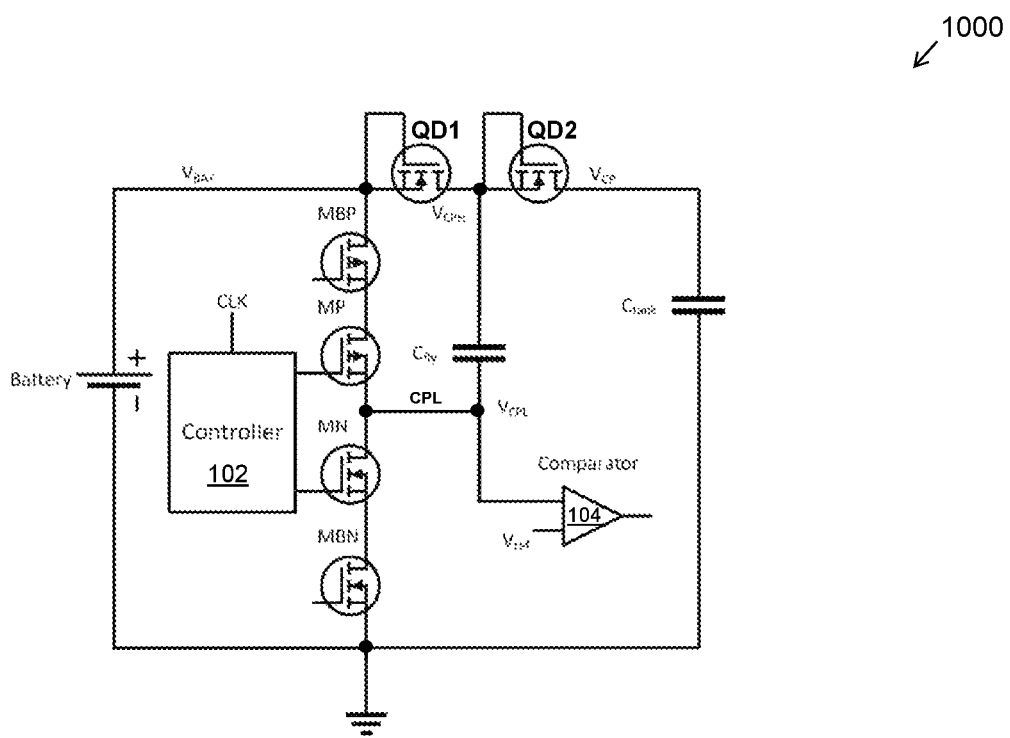
FIG. 10 illustrates a schematic diagram of yet another charge pump converter in accordance with various embodiments of the present disclosure.

FIG. 10 illustrates a schematic diagram of yet another charge pump converter in accordance with various embodiments of the present disclosure. The charge pump converter 1000 is similar to the charge pump converter 100 shown in FIG. 1 except that the diodes D1 and D2 are replaced by switches QD1 and QD2, respectively. As shown in FIG. 10, both QD1 and QD2 are n-type MOSFETs configured as diodes. The operating principle of the charge pump converter 1000 is similar to that of the charge pump converter 100, and hence is not discussed again herein.

It should be noted other control mechanisms may be applicable to QD1 and QD2. For example, the gates of QD1 and QD2 may be controlled by the controller 102 or other suitable control units. In particular, the gates of QD1 and QD2 can be controlled to operate in diode emulation mode. In other words, QD1 and QD2 are controlled to emulate diodes.

Figure 11:
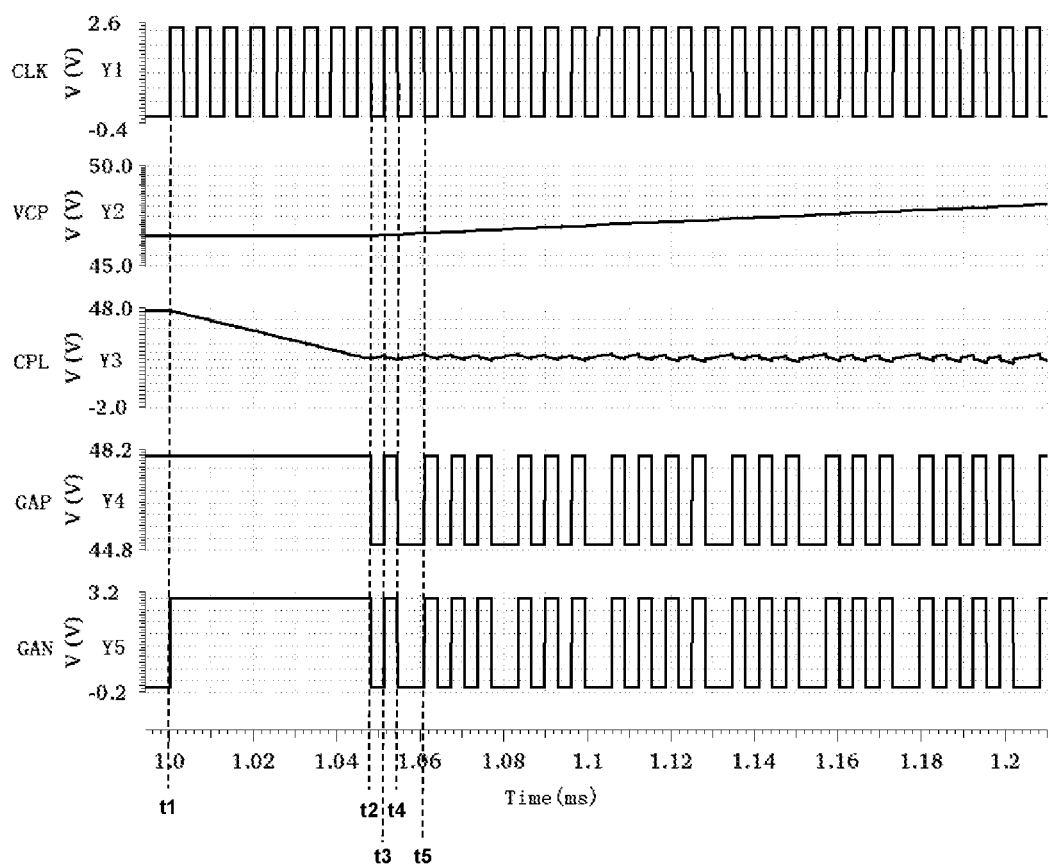
FIG. 11 illustrates another timing diagram of the charge pump converter shown in FIG. 1 in accordance with various embodiments of the present disclosure.

FIG. 11 illustrates another timing diagram of the charge pump converter shown in FIG. 1 in accordance with various embodiments of the present disclosure. The horizontal axis of FIG. 11 represents intervals of time. There are five vertical axes. The first vertical axis Y1 represents the clock signal CLK fed into the controller 102. The second vertical axis Y2 represents the output voltage $V_{CP}$ of the charge pump converter 100. The third vertical axis Y3 represents the voltage on the node CPL. The four vertical axis Y4 represents the gate drive signal GAP of the second switch MP. The fifth vertical axis Y5 represents the gate drive signal GAN of the third switch MN.

Prior to a first time instant t1, the clock signal CLK is not applied to the controller 102. As shown in Figure ii, the output voltage $V_{CP}$ is about 48 V. The voltage on the node CPL is about 48 V. The gate drive signal GAP is of a logic high state. Since the second switch MP is a p-type transistor and GAP is of the logic high state, the second switch MP is turned off. The gate drive signal GAN is of a logic low state. Since the third switch MN is an n-type transistor and GAN is of the logic low state, the third switch MN is turned off.

From the first time instant t1 to a second time instant t2, the clock signal CLK is applied to the controller 102. In response to the clock signal CLK, the gate drive signal GAN is of a logic high state. As a result, the third switch MN (n-type transistor) is turned on. The turn-on of the third switch MN provides a charge path for the flying capacitor $C_{fly}$. After the flying capacitor $C_{fly}$ has been charged, the voltage at the node CPL decreases in a linear manner from t1 to t2 as shown in FIG. 2. From t1 to t2, the output voltage $V_{CP}$ remains the same.

From the second time instant t2, the controller 102 applies the charge mode and the discharge mode to the flying capacitor $C_{fly}$. From the second time instant t2 to a third time instant t3, the gate drive signal GAP is of a logic low state. As a result, the second switch MP (p-type transistor) is turned on. The gate drive signal GAN is of a logic low state. As a result, the third switch MN (n-type transistor) is turned off. The turn-on of the second switch MP provides a discharge path for the flying capacitor $C_{fly}$. More particularly, the flying capacitor $C_{fly}$ and the battery are connected in series to provide power for the output capacitor $C_{tank}$ through the second diode D2. From t2 to t3, the output voltage $V_{CP}$ increases accordingly as shown in FIG. 11.

During the discharge mode (from t2 to t3), the voltage across the flying capacitor decreases. The voltage on the node CPL increases as shown in FIG. 11.

From the third time instant t3 to a fourth time instant t4, the gate drive signal GAP is of a logic high state. As a result, the second switch MP (p-type transistor) is turned off. The gate drive signal GAN is of a logic high state. As a result, the third switch MN (n-type transistor) is turned on. The turn-on of the third switch MN provides a charge path for the flying capacitor $C_{fly}$. More particularly, the battery charges the flying capacitor $C_{fly}$ through the first diode D1, the third switch MN and the fourth switch MBN. The second diode D2 is reverse-biased. From t3 to t4, the output voltage $V_{CP}$ remains the same as shown in Figure ii. During the charge mode (from t3 to t4), the voltage across the flying capacitor $C_{fly}$ increases. The voltage on the node CPL decreases as shown in FIG. 11.

From the fourth time instant t4 to a fifth time instant t5, only the discharge mode is applied to the flying capacitor $C_{fly}$. In other words, the discharge mode and the charge mode are not applied to the flying capacitor $C_{fly}$ in a 50:50 arrangement as indicated by the time period from t2 to t4. In particular, after the voltage on the node CPL has reached a desired voltage, the discharge mode and the charge mode are not applied to the flying capacitor $C_{fly}$ in a 50:50 arrangement. For example, as shown in FIG. 11, the charge mode may not be applied to the flying capacitor $C_{fly}$ in every clock cycle. Depending on design needs, the discharge mode may be applied to the flying capacitor $C_{fly}$ in consecutive clock cycles. The timing diagram shown in FIG. 11 is merely an example. The exact number of clock cycles in which the charge mode is applied to the flying capacitor $C_{fly}$ is determined by a feedback loop. The length of time of applying the discharge mode to the flying capacitor $C_{fly}$ is controlled such that the voltage on the node CPL is regulated at a predetermined level.

Figure 12:
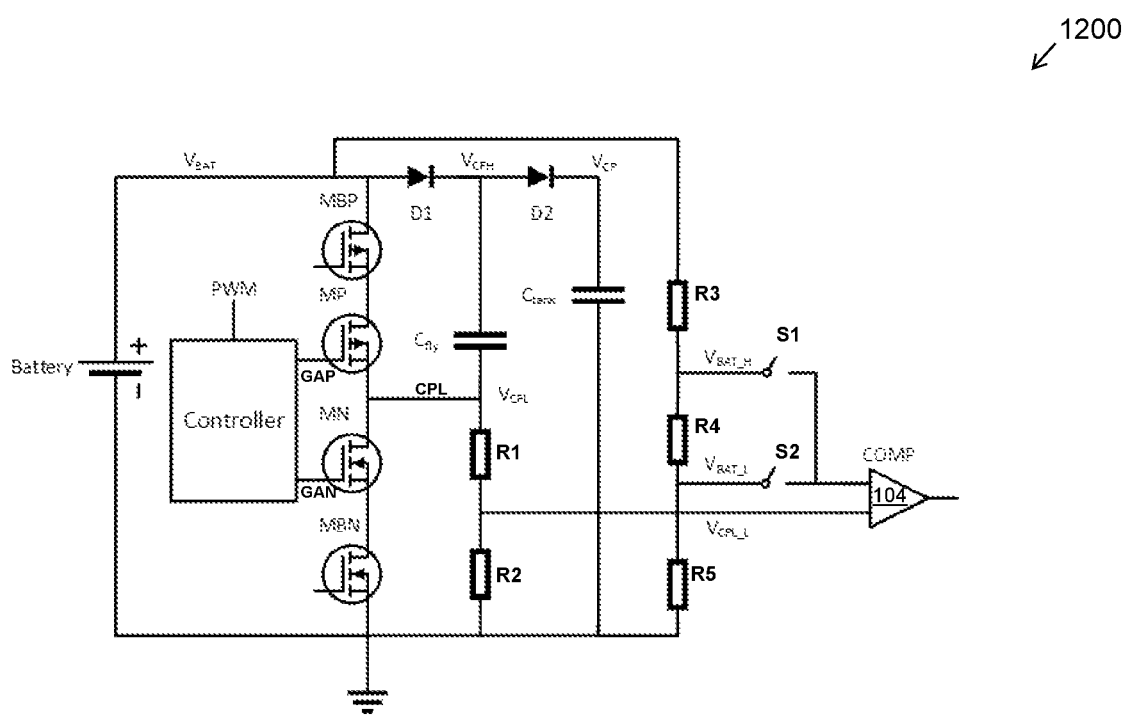
FIG. 12 illustrates a schematic diagram of yet another charge pump converter in accordance with various embodiments of the present disclosure.

FIG. 12 illustrates a schematic diagram of yet another charge pump converter in accordance with various embodiments of the present disclosure. The charge pump converter 1200 shown in FIG. 12 is similar to the charge pump converter 500 shown in FIG. 5 except that a hysteresis control scheme is employed to further improve the performance of the charge pump converter 1200.

As shown in FIG. 12, the charge pump converter 1200 includes a first resistor divider connected between the node CPL and ground, and a second resistor divider connected between $V_{BAT}$ and ground. The first resistor divider comprises resistors R1 and R2 connected in series. The first resistor divider is employed to detect the voltage on the node CPL. The common node of R1 and R2 is connected to a first input of the comparator 104. The second resistor divider comprises resistors R3, R4 and R5 connected in series. The second resistor divider is employed to generate a first voltage threshold $V_{BAT\_H}$ and a second voltage threshold $V_{BAT\_L}$. The first voltage threshold $V_{BAT\_H}$ is greater than the second voltage threshold $V_{BAT\_L}$.

The charge pump converter 1200 further includes a first control switch S1 and a second control switch S2. The first voltage threshold $V_{BAT\_H}$ and the second voltage threshold $V_{BAT\_L}$ are fed into a second input of the comparator 104 through the first control switch S1 and the second control switch S2, respectively. In other words, when the first control switch S1 is turned on and the second control switch S2 is turned off, the detected voltage $V_{CPL\_L}$ is compared with the first voltage threshold $V_{BAT\_H}$, and the comparison result is used to determine the gate drive signals of GAP and GAN. On the other hand, when the second control switch S2 is turned on and the first control switch S1 is turned off, the detected voltage $V_{CPL\_L}$ is compared with the second voltage threshold $V_{BAT\_L}$, and the comparison result is used to determine the gate drive signals of GAP and GAN. The detailed operation principle of the charge pump converter 1200 will be described below with respect to FIG. 13.

Figure 13:
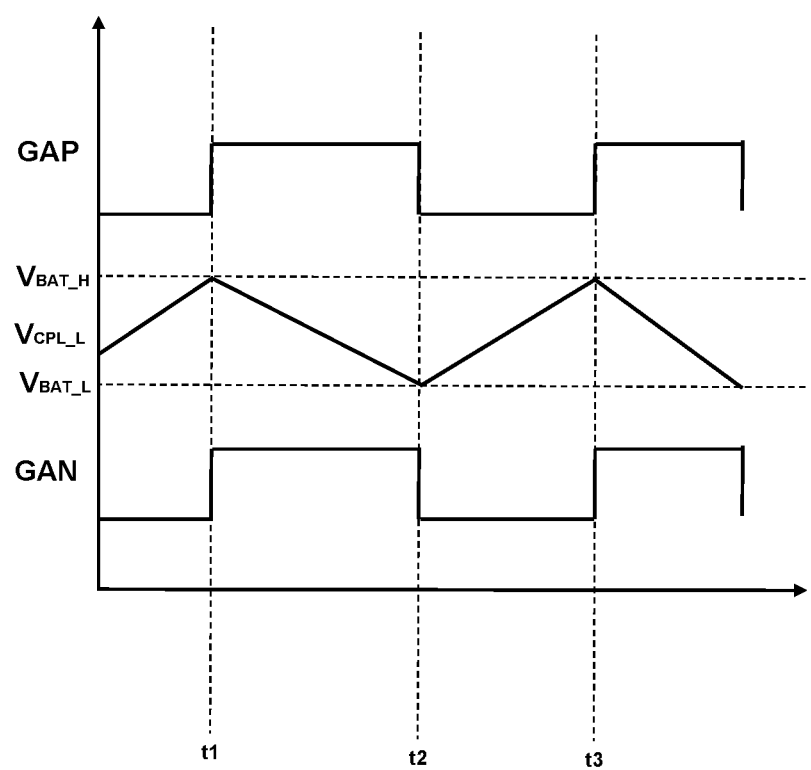
FIG. 13 illustrates a timing diagram of the charge pump converter shown in FIG. 12 in accordance with various embodiments of the present disclosure.

FIG. 13 illustrates a timing diagram of the charge pump converter shown in FIG. 12 in accordance with various embodiments of the present disclosure. GAP is the gate drive signal of the second switch MP. GAN is the gate drive signal of the third switch MN. The detected voltage $V_{CPL\_L}$ is compared with the first voltage threshold $V_{BAT\_H}$ and the second voltage threshold $V_{BAT\_L}$. At a first time instant t1, the detected voltage $V_{CPL\_L}$ is equal to the first voltage threshold $V_{BAT\_H}$. The second switch MP is turned off and the third switch MN is turned on. In response to the turn-on of the third switch MN, the flying capacitor $C_{fly}$ is charged and the voltage on the node CPL decreases accordingly. From t1 to t2, the detected voltage $V_{CPL\_L}$ drops in a linear manner. At the second time instant t2, the detected voltage $V_{CPL\_L}$ is equal to the second voltage threshold $V_{BAT\_L}$. The third switch MN is turned off and the second switch MP is turned on. In response to the turn-on of the second switch MP, the flying capacitor $C_{fly}$ is discharged and the voltage on the node CPL increases accordingly. From t2 to t3, the detected voltage $V_{CPL\_L}$ increases in a linear manner.

It should be noted that the duty cycle of the gate drive signals (e.g., GAP and GAN) is determined by the comparison results (e.g., the comparison between $V_{CPL\_L}$ and $V_{BAT\_H}$ or the comparison between $V_{CPL\_L}$ and $V_{BAT\_L}$).

It should further be noted that the hysteresis control scheme shown in FIGS. 12-13 is merely an example. A person skilled in the art would recognize that there are many alternatives, modifications and variations.

Figure 14:
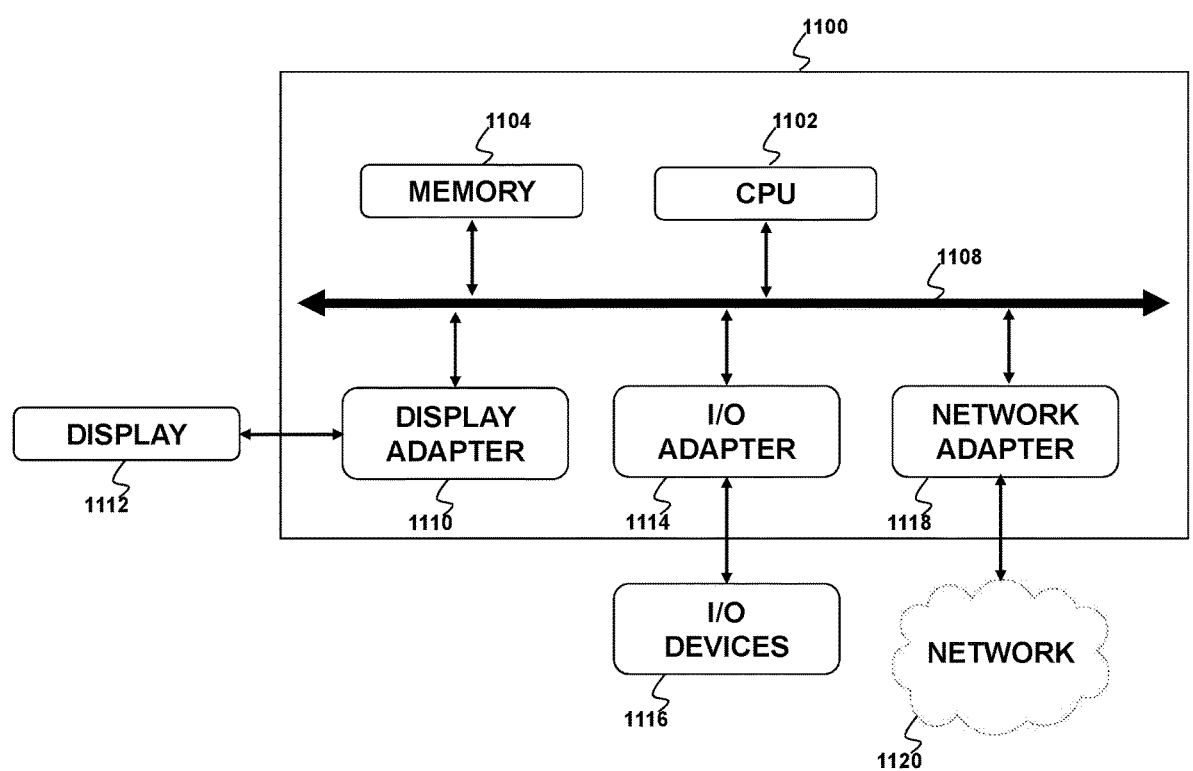
FIG. 14 illustrates a block diagram of a processing system in accordance with various embodiments of the present disclosure.

FIG. 14 illustrates a block diagram of a processing system in accordance with various embodiments of the present disclosure. The processing system 1100 depicts a general-purpose platform and the general components and functionality that may be used to implement portions of the embodiment charge pump converter and/or an external computer or processing device interfaced to the embodiment charge pump converter. For example, processing system 1100 may be used to implement a portion of controller 102 shown in FIGS. 1, 5-6, 8 and 10. In some embodiments, processing system 1100 may be used to determine and evaluate embodiment operating parameters, as well as determine the gate drive signals of the charge pump converter based on the operating parameters.

Processing system 1100 may include, for example, a central processing unit (CPU) 1102, and memory 1104 connected to a bus 1108, and may be configured to perform the processes discussed above. The processing system 1100 may further include, if desired or needed, a display adapter 1110 to provide connectivity to a local display 1112 and an input-output (I/O) Adapter 1114 to provide an input/output interface for one or more input/output devices 1116, such as a mouse, a keyboard, flash drive or the like.

The processing system 1100 may also include a network interface 1118, which may be implemented using a network adaptor configured to be coupled to a wired link, such as a network cable, USB interface, or the like, and/or a wireless/cellular link for communications with a network 1120. The network interface 1118 may also comprise a suitable receiver and transmitter for wireless communications. It should be noted that the processing system 1100 may include other components. For example, the processing system 1100 may include hardware components power supplies, cables, a motherboard, removable storage media, cases, and the like if implemented externally. These other components, although not shown, are considered part of the processing system 1100. In some embodiments, processing system 1100 may be implemented on a single monolithic semiconductor integrated circuit and/or on the same monolithic semiconductor integrated circuit as other disclosed system components.

Embodiments of the present invention are summarized here. Other embodiments can also be understood from the entirety of the specification and the claims filed herein.

Example 1. An apparatus including: a first switching device and a second switching device connected in series between a first node and a second node, a first voltage blocking device and a second voltage blocking device connected in series between the first node and a third node, a flying capacitor connected between a common node of the first switching device and the second switching device, and a common node of the first voltage blocking device and the second voltage blocking device, and a controller configured to adjust power losses in the first switching device and the second switching device through controlling charge and discharge processes of the flying capacitor.

Example 2. The apparatus of example 1, further including: a first current limiting device connected between the first node and the first switching device, and a second current limiting device connected between the second switching device and the second node, where the first current limiting device and the first switching device are p-type transistors, the second switching device and the second current limiting device are n-type transistors, and the first voltage blocking device and the second voltage blocking device are diodes.

Example 3. The apparatus of example 1, further including: a first current limiting device connected between the first node and the first switching device, and a second current limiting device connected between the second switching device and the second node, where the first current limiting device and the first switching device are p-type transistors, the second switching device and the second current limiting device are n-type transistors, and the first voltage blocking device and the second voltage blocking device are transistors.

Example 4. The apparatus of one of examples 1 to 3, where the controller is configured to detect a first voltage potential on the common node of the first switching device and the second switching device, and a second voltage potential on the first node, and apply either a charge process or a discharge process to the flying capacitor based on a comparison between the first voltage potential and the second voltage potential.

Example 5. The apparatus of one of examples 1 to 4, where the controller is configured to detect the first voltage potential on the common node of the first switching device and the second switching device through a first resistor divider and detect the second voltage potential through a second resistor divider.

Example 6. The apparatus of one of examples 1 to 4, where the comparison between the first voltage potential and the second voltage potential is carried out through a comparator.

Example 7. The apparatus of one of examples 1 to 3, where the controller is configured to detect a first voltage potential on the common node of the first switching device and the second switching device and a third voltage potential on the third node, and apply either a charge process or a discharge process to the flying capacitor based on a comparison between the first voltage potential and the third voltage potential.

Example 8. The apparatus of one of examples 1 to 7, where the controller is configured to detect a first voltage potential on the common node of the first switching device and the second switching device, and apply a discharge process to the flying capacitor in consecutive cycles to regulate the first voltage potential on the common node of the first switching device and the second switching device.

Example 9. A method including: configuring a charge pump converter to operate in a charge mode, wherein a power source is configured to charge a flying capacitor of the charge pump converter, and operate in a discharge mode to transfer energy from the flying capacitor to a load connected to the charge pump converter, detecting a terminal voltage of the flying capacitor, detecting at least one of an input voltage and an output voltage of the charge pump converter, and applying either the charge mode or the discharge mode to the flying capacitor based on a comparison between the terminal voltage of the flying capacitor and the at least one of an input voltage and an output voltage of the charge pump converter.

Example 10. The method of example 9, where the charge pump converter comprises a first switch, a second switch, a third switch and a fourth switch connected in series between two terminals of the power source, a first voltage blocking device and a second voltage blocking device connected in series between an input terminal and an output terminal of the charge pump converter, and the flying capacitor connected between a common node of the second switch and the third switch, and a common node of the first voltage blocking device and the second voltage blocking device.

Example 11. The method of example 9, further including: configuring the first switch as a first current source to limit a first current flowing through the second switch, and configuring the fourth switch as a second current source to limit a second current flowing through the third switch.

Example 12. The method of one of examples 9 to 13, further including: regulating the output voltage of the charge pump converter through dissipating power losses in the second switch and the third switch.

Example 13. The method of one of examples 9 to 13, further including: dynamically adjusting a voltage on the common node of the second switch and a third switch through applying either the charge mode or the discharge mode to the flying capacitor in a consecutive manner.

Example 14. The method of one of examples 9 to 13, further including: detecting the voltage on the common node of the second switch and the third switch, and the input voltage of the charge pump converter, charging the flying capacitor upon detecting that the voltage on the common node of the second switch and the third switch is greater than a predetermined threshold, and discharging the flying capacitor upon detecting that the predetermined threshold is greater than the voltage on the common node of the second switch and the third switch.

Example 15. A method including: configuring a charge pump converter to convert an input voltage from a power source to a higher voltage, wherein the charge pump converter comprises a first switch, a second switch, a third switch and a fourth switch connected in series between two terminals of the power source, a first voltage blocking device and a second voltage blocking device connected in series between an input terminal and an output terminal of the charge pump converter, and a flying capacitor connected between a common node of the second switch and the third switch, and a common node of the first voltage blocking device and the second voltage blocking device, detecting a first voltage on the common node of the second switch and the third switch, and applying either a charge process or a discharge process to the flying capacitor based on a comparison between the first voltage on the common node of the second switch and the third switch and an input/output voltage of the charge pump converter.

Example 16. The method of example 15, further comprising: applying the charge process to the flying capacitor upon detecting that a ratio of the first voltage on the common node of the second switch and the third switch to the input voltage of the charge pump converter is greater than a predetermined threshold, and applying the discharge process to the flying capacitor upon detecting that the ratio of the first voltage on the common node of the second switch and the third switch to the input voltage of the charge pump converter is less than the predetermined threshold.

Example 17. The method of one of examples 15 or 16, further comprising: configuring a first counter to count a consecutive charge time of the flying capacitor, and reporting a first fault upon detecting that the consecutive charge time of the flying capacitor is greater than a predetermined maximum charge time.

Example 18. The method of one of examples 15 or 16, further comprising: configuring a second counter to count a consecutive discharge time of the flying capacitor, and reporting a second fault upon detecting that the consecutive discharge time of the flying capacitor is greater than a predetermined maximum discharge time.

Example 19. The method of one of examples 15 to 18, further comprising: applying the charge process to the flying capacitor upon detecting that a ratio of the first voltage on the common node of the second switch and the third switch to the output voltage of the charge pump converter is greater than a predetermined threshold, and applying the discharge process to the flying capacitor upon detecting that the ratio of the first voltage on the common node of the second switch and the third switch to the output voltage of the charge pump converter is less than the predetermined threshold.

Example 20. The method of one of examples 15 to 19, further comprising: configuring the first switch as a first current limiting circuit to control a first current flowing through the second switch during the discharge process applied to the flying capacitor, and configuring the fourth switch as a second current limiting circuit to control a second current flowing through the third switch during the charge process applied to the flying capacitor.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An apparatus comprising:
a first switching device and a second switching device connected in series between a first node and a second node;
a first voltage blocking device and a second voltage blocking device connected in series between the first node and a third node;
a flying capacitor connected between a common node of the first switching device and the second switching device, and a common node of the first voltage blocking device and the second voltage blocking device; and
a controller configured to control a third voltage potential on the third node by switching the first switching device and the second switching device, and adjust power losses in the first switching device and the second switching device by adjusting duty cycles of the first switching device and the second switching device to regulate a first voltage potential on the common node of the first switching device and the second switching device to a predetermined voltage.

2. The apparatus of claim 1, further comprising:
a first current limiting device connected between the first node and the first switching device; and
a second current limiting device connected between the second switching device and the second node, wherein:
the first current limiting device and the first switching device are p-type transistors;
the second switching device and the second current limiting device are n-type transistors; and
the first voltage blocking device and the second voltage blocking device are diodes.

3. The apparatus of claim 1, further comprising:
a first current limiting device connected between the first node and the first switching device; and
a second current limiting device connected between the second switching device and the second node, wherein:
the first current limiting device and the first switching device are p-type transistors;
the second switching device and the second current limiting device are n-type transistors; and
the first voltage blocking device and the second voltage blocking device are transistors.

4. The apparatus of claim 1, wherein:
the controller is configured to detect the first voltage potential on the common node of the first switching device and the second switching device, and a second voltage potential on the first node, and apply either a charge process or a discharge process to the flying capacitor based on a comparison between the first voltage potential and the second voltage potential.

5. The apparatus of claim 4, wherein:
the controller is configured to detect the first voltage potential on the common node of the first switching device and the second switching device through a first resistor divider and detect the second voltage potential through a second resistor divider.

6. The apparatus of claim 4, wherein:
the comparison between the first voltage potential and the second voltage potential is carried out through a comparator.

7. The apparatus of claim 1, wherein:
the controller is configured to detect the first voltage potential on the common node of the first switching device and the second switching device and the third voltage potential on the third node, and apply either a charge process or a discharge process to the flying capacitor based on a comparison between the first voltage potential and the third voltage potential.

8. The apparatus of claim 1, wherein:
the controller is configured to detect the first voltage potential on the common node of the first switching device and the second switching device, and apply a discharge process to the flying capacitor in consecutive cycles to regulate the first voltage potential on the common node of the first switching device and the second switching device, and wherein the discharge process is applied to the flying capacitor from a beginning to an end of the consecutive cycles.

9. A method comprising:
configuring a charge pump converter to operate in a charge mode, wherein a power source is configured to charge a flying capacitor of the charge pump converter, and operate in a discharge mode to transfer energy from the flying capacitor to a load connected to the charge pump converter;
detecting a terminal voltage of the flying capacitor;
detecting at least one of an input voltage and an output voltage of the charge pump converter; and
regulating the terminal voltage of the flying capacitor through applying either the charge mode or the discharge mode to the flying capacitor based on a comparison between the terminal voltage of the flying capacitor and the at least one of an input voltage and an output voltage of the charge pump converter.

10. The method of claim 9, wherein the charge pump converter comprises:
a first switch, a second switch, a third switch and a fourth switch connected in series between two terminals of the power source;
a first voltage blocking device and a second voltage blocking device connected in series between an input terminal and an output terminal of the charge pump converter; and
the flying capacitor connected between a common node of the second switch and the third switch, and a common node of the first voltage blocking device and the second voltage blocking device.

11. The method of claim 10, further comprising:
configuring the first switch as a first current source to limit a first current flowing through the second switch; and
configuring the fourth switch as a second current source to limit a second current flowing through the third switch.

12. The method of claim 10, further comprising:
regulating the output voltage of the charge pump converter through dissipating power losses in the second switch and the third switch.

13. The method of claim 10, further comprising:
dynamically adjusting a voltage on the common node of the second switch and a third switch through applying either the charge mode or the discharge mode to the flying capacitor in a consecutive manner.

14. The method of claim 13, further comprising:
detecting the voltage on the common node of the second switch and the third switch, and the input voltage of the charge pump converter;
charging the flying capacitor upon detecting that the voltage on the common node of the second switch and the third switch is greater than a predetermined threshold; and discharging the flying capacitor upon detecting that the predetermined threshold is greater than the voltage on the common node of the second switch and the third switch.

15. A method comprising:

configuring a charge pump converter to convert an input voltage from a power source to a higher voltage, wherein the charge pump converter comprises:
- a first switch, a second switch, a third switch and a fourth switch connected in series between two terminals of the power source;
- a first voltage blocking device and a second voltage blocking device connected in series between an input terminal and an output terminal of the charge pump converter; and
- a flying capacitor connected between a common node of the second switch and the third switch, and a common node of the first voltage blocking device and the second voltage blocking device;

detecting a first voltage on the common node of the second switch and the third switch; and regulating the first voltage on the common node of the second switch and the third switch through applying either a charge process or a discharge process to the flying capacitor based on a comparison between the first voltage on the common node of the second switch and the third switch and an input/output voltage of the charge pump converter.

16. The method of claim 15, further comprising:

applying the charge process to the flying capacitor upon detecting that a ratio of the first voltage on the common node of the second switch and the third switch to the input voltage of the charge pump converter is greater than a predetermined threshold; and applying the discharge process to the flying capacitor upon detecting that the ratio of the first voltage on the common node of the second switch and the third switch to the input voltage of the charge pump converter is less than the predetermined threshold.

17. The method of claim 16, further comprising:

configuring a first counter to count a consecutive charge time of the flying capacitor; and reporting a first fault upon detecting that the consecutive charge time of the flying capacitor is greater than a predetermined maximum charge time.

18. The method of claim 16, further comprising:

configuring a second counter to count a consecutive discharge time of the flying capacitor; and reporting a second fault upon detecting that the consecutive discharge time of the flying capacitor is greater than a predetermined maximum discharge time.

19. The method of claim 15, further comprising:

applying the charge process to the flying capacitor upon detecting that a ratio of the first voltage on the common node of the second switch and the third switch to the output voltage of the charge pump converter is greater than a predetermined threshold; and applying the discharge process to the flying capacitor upon detecting that the ratio of the first voltage on the common node of the second switch and the third switch to the output voltage of the charge pump converter is less than the predetermined threshold.

20. The method of claim 15, further comprising:

configuring the first switch as a first current limiting circuit to control a first current flowing through the second switch during the discharge process applied to the flying capacitor; and configuring the fourth switch as a second current limiting circuit to control a second current flowing through the third switch during the charge process applied to the flying capacitor.

* * * * *